United States Patent
Hong

(10) Patent No.: US 12,526,767 B2
(45) Date of Patent: Jan. 13, 2026

(54) PAGING COLLISIONS PROBLEM REPORTING METHOD, ELECTRONIC DEVICE AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 372 days.

(21) Appl. No.: 18/024,929

(22) PCT Filed: Sep. 10, 2020

(86) PCT No.: PCT/CN2020/114613
§ 371 (c)(1),
(2) Date: Mar. 6, 2023

(87) PCT Pub. No.: WO2022/052007
PCT Pub. Date: Mar. 17, 2022

(65) Prior Publication Data
US 2023/0319779 A1    Oct. 5, 2023

(51) Int. Cl.
*H04W 68/02* (2009.01)
*H04W 8/20* (2009.01)
(52) U.S. Cl.
CPC ............. *H04W 68/02* (2013.01); *H04W 8/20* (2013.01)
(58) Field of Classification Search
CPC ....... H04W 68/02; H04W 8/20; H04W 88/06; H04W 68/005; H04W 8/183
See application file for complete search history.

(56) References Cited

U.S. PATENT DOCUMENTS

| | | | |
|---|---|---|---|
| 9,491,693 B1 | 11/2016 | Chuttani et al. | |
| 11,317,375 B2* | 4/2022 | Gurumoorthy | H04W 72/566 |
| 12,160,847 B2* | 12/2024 | Chen | H04W 68/02 |
| 12,238,679 B2* | 2/2025 | Jung | H04W 68/02 |
| 12,245,188 B2* | 3/2025 | Bao | H04W 68/005 |
| 2013/0090137 A1 | 4/2013 | Krishnamoorthy et al. | |
| 2015/0163827 A1 | 6/2015 | Ekici et al. | |
| 2015/0350877 A1 | 12/2015 | Li et al. | |
| 2015/0373667 A1 | 12/2015 | Rajurkar et al. | |

(Continued)

FOREIGN PATENT DOCUMENTS

| | | |
|---|---|---|
| CN | 101951653 A | 1/2011 |
| CN | 103314624 A | 9/2013 |

(Continued)

OTHER PUBLICATIONS

State Intellectual Property Office of the People's Republic of China, Office Action and Search Report Issued in Application No. 2020800020899, Jun. 30, 2023, 18 pages. (Submitted with Machine Translation).

(Continued)

*Primary Examiner* — Chandrahas B Patel
(74) *Attorney, Agent, or Firm* — Volpe Koenig

(57) ABSTRACT

A problem reporting method includes: determining a target SIM from a plurality of SIMs in response to determining that one or more paging collisions occur between the plurality of SIMs, and transmitting information associated with the one or more paging collisions to a network-side device via the target SIM.

18 Claims, 9 Drawing Sheets

(56) References Cited

U.S. PATENT DOCUMENTS

| | | | |
|---|---|---|---|
| 2016/0142998 | A1 | 5/2016 | Tsai et al. |
| 2018/0042054 | A1 | 2/2018 | Han |
| 2020/0037380 | A1 | 1/2020 | Qiu et al. |
| 2020/0107293 | A1 | 4/2020 | Cui et al. |

FOREIGN PATENT DOCUMENTS

| | | | |
|---|---|---|---|
| CN | 103404203 | A | 11/2013 |
| CN | 105025548 | A | 11/2015 |
| CN | 105554884 | A | 5/2016 |
| CN | 107690134 | A | 2/2018 |
| CN | 107889284 | A | 4/2018 |
| CN | 108024247 | A | 5/2018 |
| CN | 108924887 | A | 11/2018 |
| CN | 109618377 | A | 4/2019 |
| CN | 109863766 | A | 6/2019 |
| CN | 111030776 | A | 4/2020 |
| CN | 111294789 | A | 6/2020 |
| CN | 111512657 | A | 8/2020 |
| IN | 201934041346 | A | 4/2020 |
| WO | 2012106664 | A1 | 8/2012 |

OTHER PUBLICATIONS

ISA State Intellectual Property Office of the People's Republic of China, Written Opinion of the International Searching Authority Issued in Application No. PCT/CN2020/114613, May 26, 2021, WIPO, 8 pages.

Huawei et al,"Key points on Dual SIM SID", 3GPP TSG RAN Meeting #86, RP-192792, Sitges, Spain, Dec. 9-12, 2019, 2 pages.

CATT,"Update of solution: RAN based paging collision avoidance for NR."SA WG2 Meeting #S2-136, S2-1911066,Nov. 18-22, 2019, Reno, Nevada, USA,3 pages.

Qualcomm Incorporatedet al, "Solution for paging collision avoidance", SA WG2 Meeting #136,S2-1912399, Nov. 18-22, 2019, Reno, USA, 7 pages.

Sony, "KI2: Solution for Paging Reception with PO collision avoidance", SA WG2 Meeting #S2-136AH, S2-2000841,Jan. 13-17, 2020, Incheon, KR,5 pages.

ISA State Intellectual Property Office of the People's Republic of China, International Search Report Issued in Application No. PCT/CN2020/114613, May 26, 2021, WIPO, 6 pages.

State Intellectual Property Office of the People's Republic of China, Office Action and Search Report Issued in Application No. 2020800020899, Sep. 8, 2022, 17 pages.(Submitted with Machine/Partial Translation).

Intel et al."Solution for Paging Reception with PO collision avoidance""SA WG2 Meeting #S2-136 S2-1911942 Nov. 18-22, 2019, Reno, NV, US (revision of 1097, 1143, 1208, 1796)"Nov. 22, 2019, 4 pages.

Qualcomm Incorporated "Handling of paging collision for Multi-SIM""3GPP TSG-RAN WG2 Meeting #111-e R2-2006944 Electronic, Aug. 17-28, 2020"Aug. 28, 2020 ,4 pages.

Ericsson "Paging collision avoidance""3GPP TSG-RAN WG2 #111e Tdoc R2-2007603 Electronic meeting, Aug. 17-28, 2020"Aug. 28, 2020, 4 pages.

Qualcomm Incorporated et al "Solution for paging collision avoidance""SA WG2 Meeting #136AH S2-2000116 Jan. 13-17, 2020, Incheon, Korea (was S2-1912399)"Jan. 17, 2020, 6 pages.

* cited by examiner

Determine a first SIM from the plurality of SIMs in response to determining that one or more paging collisions occur between the plurality of SIMs, and transmit information associated with the one or more paging collisions to a network-side device via the first SIM ∼ S101

FIG. 1

Determine that a first network-side device associated with the first SIM is capable of handling the one or more paging collisions ∼ S201

Determine the first SIM for transmitting the information associated with the one or more paging collisions in response to determining that the first network-side device is capable of handling the one or more paging collisions ∼ S202

FIG. 2

Record a network-side device pool formed by one or more network-side devices that are capable of solving the paging collision problem from the network-side devices that have been accessed ∼ S301

Determine that the first network-side device belongs to the network-side device pool which includes the one or more network-side devices capable of handling the paging collision ∼ S302

FIG. 3

Determine the first SIM for transmitting the information associated with the one or more paging collisions in response to determining that the one or more paging collisions occur between the plurality of SIMs and a signal strength of the first network-side device is higher than that of the second network-side device ~ S401

FIG. 4

Determine the first SIM for transmitting the information associated with the one or more paging collisions in response to determining that the one or more paging collisions occur between the plurality of SIMs and a load of the first network-side device is lower than that of the second network-side device ~ S501

FIG. 5

Select randomly one SIM from the first SIM and the second SIM for transmitting the information associated with the one or more paging collisions in response to determining that the one or more paging collisions occur between the plurality of SIMs ~ S601

FIG. 6

Select one SIM from the first SIM and the second SIM based on first user configuration information for transmitting the information associated with the one or more paging collisions in response to determining that the one or more paging collisions occur between the plurality of SIMs ~ S701

FIG. 7

| Select randomly one SIM from the plurality of SIMs as the first SIM in response to determining that the one or more paging collisions occur between the plurality of SIMs and network-side devices associated respectively with the plurality of SIMs are the same, and transmit information associated with the one or more paging collisions to the network-side device via the first SIM | ~ S801 |

FIG. 8

| Select one SIM from the plurality of SIMs as the first SIM based on second user configuration information in response to determining that the one or more paging collisions occur between the plurality of SIMs and network-side devices associated respectively with the plurality of SIMs are the same, and transmit information associated with the one or more paging collisions to the network-side device via the first SIM | ~ S901 |

FIG. 9

| Select one SIM from the plurality of SIMs as the first SIM based on network configuration information in response to determining that the one or more paging collisions occur between the plurality of SIMs and network-side devices associated respectively with the plurality of SIMs are the same, and transmit information associated with the one or more paging collisions to the network-side device via the first SIM | ~ S1001 |

FIG. 10

Perform respective accesses via the plurality of SIMs to the associated network-side devices in response to determining that the one or more paging collisions occur between the plurality of SIMs, and after one SIM has accessed its network-side device, prevent the other SIMs from accessing their network-side devices, take the SIM that has accessed its network-side device as the first SIM, and transmit information associated with the one or more paging collisions to the network-side device via the first SIM ~ S1101

FIG. 11

Determine a first SIM from the plurality of SIMs in response to determining that one or more paging collisions occur between the plurality of SIMs, and transmit information associated with the one or more paging collisions to a network-side device via the first SIM ~ S101

Transmit assistance information and/or a recommended solution scheme about the information associated with the paging collision problem to the network-side device ~ S1201

FIG. 12

PAGING COLLISIONS PROBLEM REPORTING METHOD, ELECTRONIC DEVICE AND STORAGE MEDIUM

CROSS-REFERENCE TO RELATED APPLICATION

This application is the U.S. national phase application of International Application No. PCT/CN2020/114613, filed on Sep. 10, 2020, the disclosure of which is incorporated herein by reference in its entirety for all purposes.

TECHNICAL FIELD

The present disclosure relates to the field of communication technologies, and in particular, to problem reporting methods, problem reporting apparatuses, electronic devices, and computer-readable storage media.

BACKGROUND

A plurality of subscriber identity modules (SIMs) may be inserted in a multi-SIM terminal, in which each SIM may receive a paging message individually and thereby establish a communication connection with a base station.

In some scenes, one or more overlaps may occur between paging occasions (occasions for receiving the paging message) of different SIMs, which results in one or more paging collisions when different SIMs are to receive their paging messages at the same time.

SUMMARY

In view of the above, the present disclosure provides problem reporting methods, problem reporting apparatuses, electronic devices, and computer-readable storage media to solve the technical problem in the related arts.

According to a first aspect of the present disclosure, a problem reporting method is provided. The method is applicable to a terminal in which a plurality of subscriber identity modules (SIMs) are inserted, and includes: determining a target SIM from the plurality of SIMs in response to determining that one or more paging collisions occur between the plurality of SIMs, and transmitting information associated with the one or more paging collisions to a network-side device via the target SIM.

According to a second aspect of the present disclosure, an electronic device is provided, and includes: one or more processors; and one or more memories for storing instructions executable by the one or more processors; where the one or more processors are configured to implement the above method.

According to a third aspect of the present disclosure, a non-transitory computer-readable storage medium having a computer program stored thereon is provided, where the program, when executed by one or more processors, implements the steps of the above method.

BRIEF DESCRIPTION OF THE DRAWINGS

The drawings related to the description of the examples will be briefly introduced to explain the technical solutions provided by the examples of the present disclosure more clearly. It is obvious that, the drawings in the following description illustrate only some examples of the present disclosure, and based on these drawings, those of ordinary skill in the art may obtain other drawings without creative work.

FIG. 1 illustrates a schematic flowchart of a problem reporting method according to an example of the present disclosure.

FIG. 2 illustrates a schematic flowchart of another problem reporting method according to an example of the present disclosure.

FIG. 3 illustrates a schematic flowchart of another problem reporting method according to an example of the present disclosure.

FIG. 4 illustrates a schematic flowchart of another problem reporting method according to an example of the present disclosure.

FIG. 5 illustrates a schematic flowchart of another problem reporting method according to an example of the present disclosure.

FIG. 6 illustrates a schematic flowchart of another problem reporting method according to an example of the present disclosure.

FIG. 7 illustrates a schematic flowchart of another problem reporting method according to an example of the present disclosure.

FIG. 8 illustrates a schematic flowchart of another problem reporting method according to an example of the present disclosure.

FIG. 9 illustrates a schematic flowchart of another problem reporting method according to an example of the present disclosure.

FIG. 10 illustrates a schematic flowchart of another problem reporting method according to an example of the present disclosure.

FIG. 11 illustrates a schematic flowchart of another problem reporting method according to an example of the present disclosure.

FIG. 12 illustrates a schematic flowchart of another problem reporting method according to an example of the present disclosure.

DETAILED DESCRIPTION OF THE EMBODIMENTS

Figure 13:
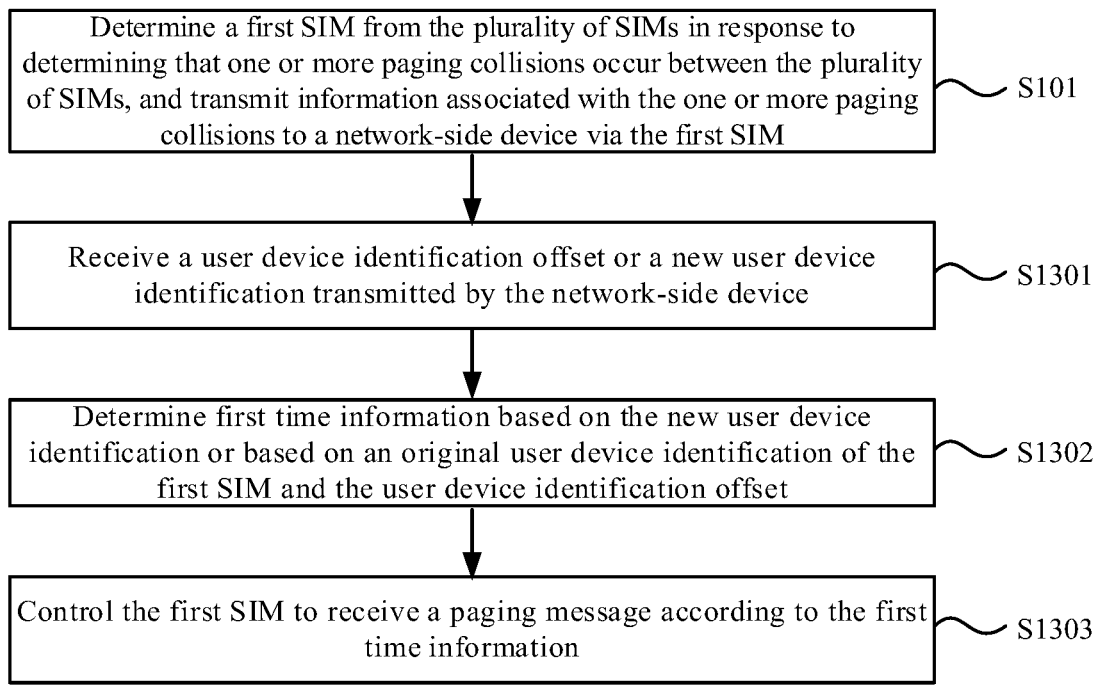
FIG. 13 illustrates a schematic flowchart of another problem reporting method according to an example of the present disclosure.

The following, in conjunction with the drawings of the examples of the present disclosure, will clearly and completely describe the technical solutions provided in the examples of the present disclosure. It is obvious that the described examples are a part, but not all, of the examples of the present disclosure. Based on the examples provided in the present disclosure, all of other examples, which can be obtained by those of ordinary skill in the art without creative work, shall fall within the protection scope of this application.

FIG. 1 illustrates a schematic flowchart of a problem reporting method according to an example of the present disclosure. The problem reporting method illustrated in this example is applicable to a terminal. The terminal includes, but is not limited to, an electronic device such as a mobile phone, a tablet computer, a wearable device, a sensor, and an Internet of Things device. The terminal may act as user equipment to communicate with a base station. The base station includes, but is not limited to, a base station in a communication system, such as a 4G base station, a 5G base station, and a 6G base station.

A plurality of subscriber identity modules (SIMs) are inserted in the terminal. The plurality of SIMs may belong to the same operator network, or may belong to different operator networks. For example, the plurality of SIMs may belong to different operator networks separately. Alternatively, a part of the plurality of SIMs may belong to a first operator network, and the other part may belong to a second operator network.

As illustrated in FIG. 1, the problem reporting method may include the following step.

At step S101, a first SIM is determined from the plurality of SIMs in response to determining that one or more paging collisions occur between the plurality of SIMs, and information associated with the one or more paging collisions is transmitted to a network-side device via the first SIM.

In one example, the terminal may determine whether there are one or more paging collisions between the plurality of SIMs. The so-called paging collisions may be existing paging collisions, or paging collisions that will occur (for example, within a preset period in future), or both of the above, which can be configured as required.

It should be noted that the plurality of SIMs may refer to two SIMs, or more than two SIMs. That is, the examples of the present disclosure may be applicable to a situation where there is a paging collision between two SIMs, and may also be applicable to a situation where there is one or more paging collisions between more than two SIMs.

The one or more paging collisions between the plurality of SIMs may mean that there are one or more paging collisions between one SIM and multiple SIMs. For example, at least SIM #A, SIM #B and SIM #C are inserted in the terminal, the paging occasion of SIM #A and the paging occasion of SIM #B do not overlap with each other, but the paging occasion of SIM #A overlaps with the paging occasion of SIM #C, and the paging occasion of SIM #B overlaps with the paging occasion of SIM #C.

The one or more paging collisions between the plurality of SIMs may mean that there is a paging collision between any two or more than two SIMs. For example, at least SIM #A, SIM #B and SIM #C are inserted in the terminal, the paging occasion of SIM #A overlaps with both the paging occasion of SIM #B and the paging occasion of SIM #C, and the paging occasion of SIM #B overlaps with the paging occasion of SIM #C.

In related arts, once it is determined that there are one or more paging collisions between the SIMS, each SIM involving the paging collisions is to transmit information associated with the paging collision problem to its corresponding network-side device. For example, when there is the paging collision between the first SIM and a second SIM, the first SIM is to transmit the information associated with the paging collision problem to a first network-side device, and the second SIM is to transmit the information associated with the paging collision problem to a second network-side device.

The first network-side device is to provide feedback information to the first SIM, so that the first SIM changes its paging occasion for receiving a paging message. The second network-side device is to provide feedback information to the second SIM, so that the second SIM changes its paging occasion for receiving a paging message. The network-side devices may be configured similarly, and thereby the feedback information provided by the first network-side device to the first SIM may be similar to the feedback information provided by the second network-side device to the second SIM. As a result, the changed paging occasion of the first SIM still overlaps with the changed paging occasion of the second SIM, that is, some paging collisions still occur.

According to the example of the present disclosure, when there is one or more paging collisions between the plurality of SIMs, the information associated with the paging collision problem is transmitted to the network-side device via only one of the plurality of SIMs, rather than via each of the plurality of SIMs separately. Thus, it can be ensured that only one network-side device receives the paging collision problem, and then provides the feedback information to one SIM, so that the SIM receiving the feedback information changes its paging occasion for a paging message reception while the other SIMs do not change their paging occasions for the paging message reception, thereby avoiding a situation where the paging collision problem continues to occur due to the change of the paging occasion of each SIM.

In one example, the network-side device includes, but is not limited to, a base station, a core network, etc. When the network-side device is the base station, the SIM may transmit the information associated with the paging collision problem to the base station through radio resource control (RRC) layer signaling. When the network-side device is the core network, the SIM may transmit the information associated with the paging collision problem to the core network through non-access stratum (NAS) signaling.

In one example, the information associated with the one or more paging collisions includes, but is not limited to, an indicator of the paging collision problem, a type or level of each paging collision. Although in current communication systems, paging messages have not yet been defined with specific types, it is not excluded that different paging message types are configured for the paging messages in subsequent evolutions of an LTE or NR system. Therefore, the types of paging collision may include but are not limited to the types of paging message on the paging collisions occurring, including but not limited to video-based paging, audio-based paging, voice-based paging, etc. Based on the information associated with the one or more paging collisions, the network-side device may not only determine that there is the paging collision problem between the plurality of SIMs of the terminal, but also may accurately make a paging collision solving scheme or strategy according to the above information such as the types and feed back to the terminal, so as to solve the paging collision problem well.

FIG. 2 illustrates a schematic flowchart of another problem reporting method according to an example of the present disclosure. As illustrated in FIG. 2, determining the first SIM from the plurality of SIMs includes the following steps.

At step S201, it determines that a first network-side device associated with the first SIM is capable of handling the one or more paging collisions.

At step S202, the first SIM is determined for transmitting the information associated with the one or more paging collisions in response to determining that the first network-side device is capable of handling the one or more paging collisions.

In one example, it may first determine whether the first network-side device associated with the first SIM is capable of handling the one or more paging collisions, and then determine that the first SIM is used to transmit the information associated with the one or more paging collisions if the first network-side device is determined to be capable of handling the one or more paging collisions, so as to ensure that the first network-side device can successfully solve the paging collision problem after the information associated with the one or more paging collisions is transmitted to the first network-side device.

Alternatively or additionally, determining that the first network-side device associated with the first SIM is capable of handling the one or more paging collisions is in response to determining that the first network-side device associated with the first SIM is different from the second network-side device associated with the second SIM of the plurality of SIMs.

In one example, the network-side device associated with the SIM includes the network-side device that transmits the paging message to the SIM. The network-side devices associated with different SIMs may be different or the same.

In the case where the first network-side device associated with the first SIM is different from the second network-side device associated with the second SIM of the plurality of SIMs, it may determine whether the first network-side device associated with the first SIM is capable of handling the one or more paging collisions, so as to select the first network-side device that is capable of handling the one or more paging collisions from the network-side devices associated respectively with the plurality of SIMs cards, and then transmit the information associated with the one or more paging collisions to the first network-side device.

Alternatively or additionally, the method further includes:
determining that the second network-side device is capable of handling the one or more paging collisions in response to determining that the first network-side device is different from the second network-side device.

In one example, in the case where the first network-side device and the second network-side device are different, it may further determine whether the second network-side device is capable of handling the one or more paging collisions. If it is determined that the second network-side device is capable of handling the one or more paging collisions, both the first network-side device and the second network-side device are capable of handling the one or more paging collisions. The first network-side device and the second network-side device refer to the network-side devices corresponding respectively to any two different SIMs of the plurality of SIMs. Therefore, when both the first network-side device and the second network-side device are capable of handling the one or more paging collisions, it means that both the network-side devices corresponding respectively to any two different SIMs of the plurality of SIMs are capable of handling the one or more paging collisions.

In this case, it may further determine whether to select transmitting the information associated with the one or more paging collisions to the first network-side device via the first SIM, or to select transmitting the information associated with the one or more paging collisions to the second network-side device via the second SIM. The specific approach of selecting the first SIM or the second SIM will be illustrated in subsequent examples.

It should be noted that the first SIM and the second SIM do not refer to specific SIMs, but any two different SIMs of the plurality of SIMs between which the one or more paging collision occurs.

In one example, the first network-side device for accessing the first SIM (for example, the base station that transmits the paging message to the first SIM) and the second network-side device for accessing the second SIM (for example, the base station that transmits the paging message to the second SIM) are the same or different. For example, they are different base stations in the same operator network, or different base stations in different operator networks.

FIG. 3 illustrates a schematic flowchart of another problem reporting method according to an example of the present disclosure. As illustrated in FIG. 3, determining that the first network-side device is capable of handling the one or more paging collisions includes the following step.

At step S302, it determines that the first network-side device belongs to a network-side device pool that includes one or more network-side devices capable of handling the paging collision.

Alternatively or additionally, the method further includes:
step S301: recording, from network-side devices that have been accessed previously, one or more network-side devices that are capable of solving the paging collision problem to form the network-side device pool.

In one example, the terminal may determine one or more network-side devices capable of solving the paging collision problem from the network-side devices, which have been accessed, and then record the one or more network-side devices capable of solving the paging collision problem to form the network-side device pool. Subsequently, during determining the first network-side device, it may determine whether the first network-side device belongs to the network-side device pool. If it is determined that the first network-side device belongs to the network-side device pool, it can be determined that the first network-side device is capable of solving the paging collision problem since the network-side devices belong to the network-side device pool are capable of solving the paging collision problem.

It should be noted that the network-side devices in the network-side device pool may be configured with a valid duration. For example, the network-side device in the network-side device pool, which is recorded within a preset time range before the current moment, is kept in the network-side device pool, while the network-side device, which is recorded outside the preset time range before the current moment, may be removed from the network-side device pool.

In another example, the network-side device pool may be determined by the UE itself based on one or more specific decision conditions (for example, the terminal obtains, from the network-side device, the capability information of the network-side device, which indicates whether the network-side device supports solving the paging collision problem, and then adds the network-side device into the network-side device pool based on the capability information). Alternatively, the network-side device pool may be notified to the terminal by one or more network-side devices through signaling (for example, the one or more network-side devices are to send a list of network-side devices that are capable of solving the paging collision problem to the terminal through control signaling).

Alternatively or additionally, the terminal may also transmit a decision request to the network-side device for determining whether the network-side device to be determined owns the capability of handling the one or more paging collisions. In response to the decision request, the network-side device transmits a decision response to the terminal for indicating whether the network-side device to be determined is capable of solving the paging collision problem. Based on the decision response, the terminal determines that the network-side device to be determined is capable of solving the paging collision problem.

FIG. 4 illustrates a schematic flowchart of another problem reporting method according to an example of the present disclosure. As illustrated in FIG. 4, determining the first SIM from the plurality of SIMs further includes the following step.

At step S401, the first SIM is determined for transmitting the information associated with the one or more paging collisions in response to determining that a signal strength of the first network-side device is higher than that of the second network-side device.

In one example, in the case where the first network-side device and the second network-side device are capable of solving the paging collision problem separately, it may determine the network-side device with higher signal strength from the first network-side device and the second network-side device. Therefore, the paging collision problem is submitted to the network-side device with higher signal strength via the SIM that is configured to access the network-side device with higher signal strength.

For example, the terminal may detect the signal strengths of the first network-side device and the second network-side device individually. The first SIM is determined for transmitting the information associated with the one or more paging collisions if the signal strength of the first network-side device is higher than that of the second network-side device, and the second SIM is determined for transmitting the information associated with the one or more paging collisions if the signal strength of the second network-side device is higher than that of the first network-side device. In general, the higher the signal strength of the network-side device, the better a communication quality. Therefore, by selecting the network-side device with higher signal strength to which the information associated with the paging collision problem is transmitted, it can be ensured that the paging collision problem is successfully submitted to the network-side device.

FIG. 5 illustrates a schematic flowchart of another problem reporting method according to an example of the present disclosure. As illustrated in FIG. 5, determining the first SIM from the plurality of SIMs further includes the following step.

At step S501, the first SIM is determined for transmitting the information associated with the one or more paging collisions in response to determining that a load of the first network-side device is lower than that of the second network-side device.

In one example, in the case where both the first network-side device and the second network-side device are capable of solving the paging collision problem, it may determine the network-side device with lower load from the first network-side device and the second network-side device. Therefore, the paging collision problem is submitted to the network-side device with lower load via the SIM that is configured to access the network-side device with lower load.

For example, the terminal may detect the loads of the first network-side device and the second network-side device individually (by, for example, requesting the network-side devices to transmit their load information). The first SIM is determined for transmitting the information associated with the one or more paging collisions if the load of the first network-side device is lower than that of the second network-side device, and the second SIM is determined for transmitting the information associated with the one or more paging collisions if the load of the second network-side device is lower than that of the first network-side device. In general, the lower the load of the network-side device, the faster a processing speed. Therefore, by selecting the network-side device with lower load to which the information associated with the paging collision problem is transmitted, it can be ensured that the network-side device provides the feedback information to the terminal as soon as possible to solve the paging collision problem.

FIG. 6 illustrates a schematic flowchart of another problem reporting method according to an example of the present disclosure. As illustrated in FIG. 6, determining the first SIM from the plurality of SIMs further includes the following step.

At step S601, one SIM is randomly selected from the first SIM and the second SIM for transmitting the information associated with the one or more paging collisions.

In one example, in the case where both the first network-side device and the second network-side device are capable of solving the paging collision problem, one SIM may be randomly selected from the plurality of SIMs. Therefore, the information associated with the one or more paging collisions is transmitted via the selected SIM to the corresponding network-side device.

For example, by randomly selecting the selected SIM as the first SIM, the information associated with the paging collision problem may be transmitted to the first network-side device via the first SIM. Accordingly, the paging collision problem can be submitted to the network-side device as soon as possible without considering the conditions of the network-side devices and the SIMs.

FIG. 7 illustrates a schematic flowchart of another problem reporting method according to an example of the present disclosure. As illustrated in FIG. 7, determining the first SIM from the plurality of SIMs further includes the following step.

At step S701, one SIM is selected from the first SIM and the second SIM based on first user configuration information for transmitting the information associated with the one or more paging collisions.

In one example, in the case where both the first network-side device and the second network-side device are capable of solving the paging collision problem, one SIM may be selected from the first SIM and the second SIM based on the first user configuration information. Therefore, the information associated with the one or more paging collisions is transmitted via the selected SIM to the corresponding network-side device.

For example, the first user configuration information indicates that when there are one or more paging collisions between the plurality of SIMs, the information associated with the paging collision problem is transmitted to the network-side device via the first SIM. Thus, the information associated with the one or more paging collisions is transmitted to the first network-side device via the first SIM.

Accordingly, the paging collision problem can be submitted to the network-side device as soon as possible without considering the conditions of the network-side devices and the SIMs, and it makes the SIM for transmitting the information associated with the paging collision problem satisfy user requirements.

FIG. 8 illustrates a schematic flowchart of another problem reporting method according to an example of the present disclosure. As illustrated in FIG. 8, determining the first SIM from the plurality of SIMs includes the following step.

At step S801, one SIM is randomly selected from the plurality of SIMs as the first SIM in response to determining that network-side devices associated respectively with the plurality of SIMs are the same.

In one example, when the network-side devices associated respectively with the plurality of SIMs are the same, the information associated with the paging collision problem is transmitted to the same network-side device regardless of which SIM of the plurality of SIMs is used to transmit the information associated with the paging collision problem. Therefore, one SIM may be randomly selected from the plurality of SIMs as the first SIM, and then the information associated with the one or more paging collisions is transmitted via the selected SIM to the corresponding network-side device.

For example, by randomly selecting the selected SIM as the first SIM, the information associated with the one or more paging collisions may be transmitted to the first network-side device via the first SIM. Accordingly, the paging collision problem can be submitted to the network-side device as soon as possible without considering the conditions of the network-side devices and the SIMs.

FIG. 9 illustrates a schematic flowchart of another problem reporting method according to an example of the present disclosure. As illustrated in FIG. 9, determining the first SIM from the plurality of SIMs includes the following step.

At step S901, one SIM is selected from the plurality of SIMs as the first SIM based on second user configuration information in response to determining that network-side devices associated respectively with the plurality of SIMs are the same.

In one example, when the network-side devices associated respectively with the plurality of SIMs are the same, the information associated with the paging collision problem is transmitted to the same network-side device regardless of which SIM of the plurality of SIMs is used to transmit the information associated with the paging collision problem. Therefore, one SIM may be selected from the plurality of SIMs as the first SIM based on the second user configuration information, and then the information associated with the one or more paging collisions is transmitted via the selected SIM to the corresponding network-side device.

For example, the second user configuration information indicates that when there are one or more paging collisions between the plurality of SIMs, the information associated with the paging collision problem is transmitted to the network-side device via the first SIM. Thus, the information associated with the one or more paging collisions is transmitted to the first network-side device via the first SIM. Accordingly, the paging collision problem can be submitted to the network-side device as soon as possible without considering the conditions of the network-side devices and the SIMS, and it makes the SIM for transmitting the information associated with the paging collision problem satisfy user requirements.

FIG. 10 illustrates a schematic flowchart of another problem reporting method according to an example of the present disclosure. As illustrated in FIG. 10, determining the first SIM from the plurality of SIMs includes the following step.

At step S1001, one SIM is selected from the plurality of SIMs as the first SIM based on network configuration information in response to determining that network-side devices associated respectively with the plurality of SIMs are the same.

In one example, when the network-side devices associated respectively with the plurality of SIMs are the same, the information associated with the paging collision problem is transmitted to the same network-side device regardless of which SIM of the plurality of SIMs is used to transmit the information associated with the paging collision problem, and the network-side device may communicate with each SIM. Therefore, the network-side device may transmit the network configuration information to the terminal to instruct the terminal to select a certain SIM for transmitting the information associated with the one or more paging collisions, so that the SIM for transmitting the information associated with the paging collision problem meets the requirements of the network-side device.

FIG. 11 illustrates a schematic flowchart of another problem reporting method according to an example of the present disclosure. As illustrated in FIG. 11, determining the first SIM from the plurality of SIMs includes the following step.

At step S1101, it performs respective accesses via the plurality of SIMs to their associated network-side devices, and after one SIM has accessed its network-side device, prevents the other SIMs from accessing their network-side devices and takes the SIM that has accessed its network-side device as the first SIM.

In one example, the terminal may access corresponding network-side devices via the plurality of SIMs, respectively, rather than select a certain SIM for transmitting the information associated with the paging collision problem to the network-side device. Since different access processes between the SIMs and the network-side devices differ with each other due to the influence of their statuses, the plurality of SIMs generally cannot access their network-side devices at the same time. Therefore, after one of the SIMs accesses to the network-side device, another SIM may be controlled to stop accessing its network-side device, and then the information associated with the one or more paging collisions is transmitted via the SIM, which has accessed the network-side device and is taken as the first SIM, to the accessed network-side device.

Accordingly, it only focuses on which SIM accessing the network-side device first without considering the conditions of the network-side devices and the SIMs, which helps ensure to submit the paging collision problem to the network-side device as soon as possible.

FIG. 12 illustrates a schematic flowchart of another problem reporting method according to an example of the present disclosure. As illustrated in FIG. 12, the method further includes the following step.

At step S1201, assistance information and/or a recommended solution scheme about the information associated with the paging collision problem is transmitted to the network-side device. In particular, step S1201 and step S101 may be performed synchronously. For example, the assistance information and/or the recommended solution scheme are transmitted at the time that the information associated with the paging collision problem is transmitted. Step S1201 and step S101 may be performed asynchronously. For example, the assistance information and/or the recommended solution scheme may be transmitted after the information associated with the paging collision problem is transmitted.

In one example, in addition to the information associated with the paging collision problem transmitted to the network-side device, the information, such as the assistance information and the recommended solution scheme about the information associated with the paging collision problem, may also be transmitted to the network-side device.

In one example, the assistance information includes, but is not limited to, an identification of each SIM suffering the paging collision. The network-side device may take the received identification as a user device identification and then determine the paging occasion of the SIM based on the user device identification. Therefore, it is possible to accurately determine how the paging occasion of each SIM is collided, so as to provide an accurate solution scheme for the terminal to solve the paging collision problem.

In one example, transmitting the solution scheme from the network-side device to the terminal for solving the paging collision problem includes, but is not limited to, transmitting a user device identification offset to the terminal and transmitting a new user device identification to the terminal. The terminal may predetermine which solution scheme is more suitable for itself and thereby transmit the recommended solution scheme to the base station, which makes the solution scheme transmitted by the base station suitable for the terminal.

It should be noted that the types of the one or more paging collisions may also be included in the assistance information and transmitted to the network-side device in the above example.

FIG. 13 illustrates a schematic flowchart of another problem reporting method according to an example of the present disclosure. As illustrated in FIG. 13, the method further includes the following steps.

At step S1301, a user device identification offset or a new user device identification transmitted by the network-side device is received.

At step S1302, first time information is determined based on the new user device identification or based on an original user device identification of the first SIM and the user device identification offset.

At step S1303, the first SIM is controlled to receive a paging message according to the first time information.

In one example, in order to solve the paging collision problem, the network-side device may transmit the user device identification offset to the terminal, or may transmit the new user device identification to the terminal.

If the new user device identification is transmitted by the network-side device, the terminal may directly calculate based on the new user device identification and obtain a new paging occasion for the first SIM to receive the paging message, that is, the first time information. Therefore, the terminal may control the first SIM to receive the paging message according to the first time information, thereby avoiding paging collisions with the other SIMs.

If the user device identification offset is transmitted by the network-side device, the terminal may adjust the original user device identification of the first SIM based on the user device identification offset, and then calculate based on the adjusted user device identification and obtain a new paging occasion for the first SIM to receive the paging message, that is, the first time information. Therefore, the terminal may control the first SIM to receive the paging message according to the first time information, thereby avoiding paging collisions with the other SIMs.

Figure 14:
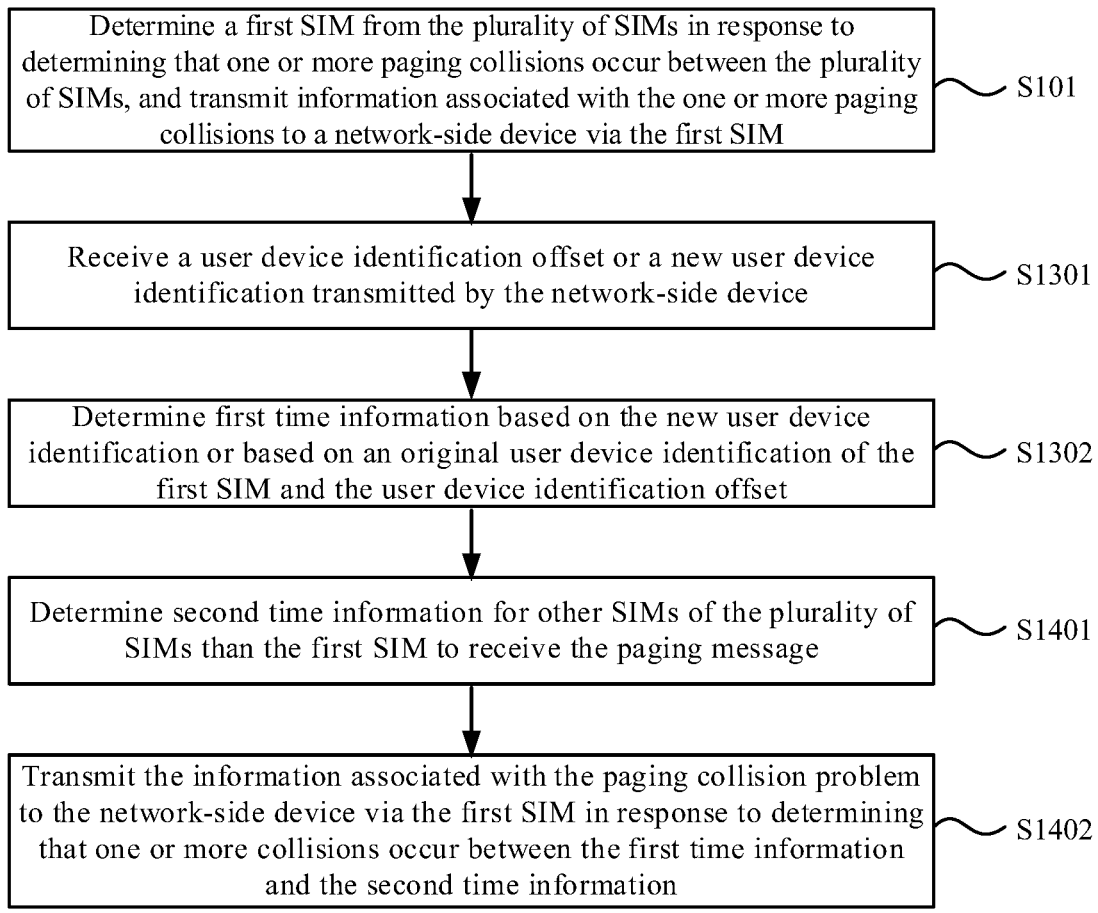
FIG. 14 illustrates a schematic flowchart of another problem reporting method according to an example of the present disclosure.

FIG. 14 illustrates a schematic flowchart of another problem reporting method according to an example of the present disclosure. As illustrated in FIG. 14, the method further includes the following steps.

At step S1401, the second time information for other SIMs of the plurality of SIMs, compared to the first SIM, is determined to receive the paging message.

At step S1402, the information associated with the paging collision problem is transmitted to the network-side device via the first SIM in response to determining that one or more collisions occur between the first time information and the second time information.

Alternatively and/or additionally, controlling the first SIM to receive a paging message according to the first time information includes:

controlling the first SIM to receive the paging message according to the first time information in response to determining that no collision occurs between the first time information and the second time information.

In one example, before controlling the first SIM to receive the paging message according to the first time information, the terminal may first determine the second time information for the other SIMs of the plurality of SIMs than the first SIM to receive the paging message, and then determine whether one or more collisions still occur between the first time information and the second time information (for example, there are one or more overlaps in a time domain). If there are still one or more collisions, it may be determined that the paging collision problem has not been solved. The information associated with the paging collision problem may be transmitted to the network-side device again, so as to accurately solve the paging collision problem. In the case where there is no collision between the first time information and the second time information, it may be determined that the paging collision problem has been solved, and the first SIM may be controlled to receive the paging message according to the first time information.

In one example, when the terminal transmits the information associated with the paging collision problem to the network-side device via the first SIM for the first time, the assistance information in the above example may not be carried, so as to reduce the amount of data transmitted during the communication process.

In the case where there are one or more collisions between the first time information and the second time information, the information associated with the paging collision problem may be transmitted to the network-side device via the first SIM again, and the assistance information may be carried in the re-transmitted paging collision problem, so that the base station can accurately determine how the paging occasions of the two SIMs collide, and thereby provide an accurate solution scheme for the terminal to solve the paging collision problem.

In one example, if the plurality of SIMs between which the one or more paging collisions occur include more than two SIMs and the one or more paging collisions occurs between one SIM and any of the other SIMs, i.e., no paging collision occurs between the other SIMs, the one SIM may be selected as the first SIM.

For example, at least SIM #A, SIM #B and SIM #C are inserted in the terminal, the paging occasions of SIM #A and SIM #B do not overlap with each other, but the paging occasion of SIM #A and the paging occasion of SIM #C overlap and the paging occasion of SIM #B and the paging occasion of SIM #C overlap. In this case, SIM #C may be selected as the first SIM.

If SIM #A or SIM #B is selected as the first SIM, for example, SIM #A is selected as the first SIM, since there is no paging collision between SIM #A and SIM #B, SIM #A is only to transmit the user device identification of SIM #C, rather than together with the user device identification of SIM #B, to the network-side device when transmitting the assistance information to the network-side device. Therefore, by adopting the new user device identification determined by the network-side device, it can only be ensured to avoid the paging collision with SIM #C, but may suffer the paging collision with SIM #B.

However, in this example, SIM #C may be selected as the first SIM, and then SIM #C may transmit the user device identifications of both SIM #A and SIM #B to the network-side device when transmitting the assistance information to the network-side device. Therefore, adopting the new user device identification determined by the network-side device can ensure the avoidance of paging collisions with both SIM #A and SIM #B, thereby effectively solving one or more paging collisions.

Figure 15:
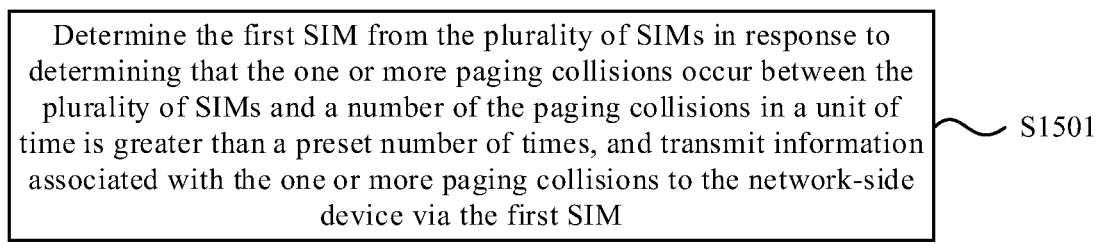
FIG. 15 illustrates a schematic flowchart of another problem reporting method according to an example of the present disclosure.

FIG. 15 illustrates a schematic flowchart of another problem reporting method according to an example of the present disclosure. As illustrated in FIG. 15, determining the first SIM from the plurality of SIMs in response to determining that the one or more paging collisions occur between the plurality of SIMs includes the following step.

At step S1501, the first SIM is determined from the plurality of SIMs in response to determining that the one or more paging collisions occur between the plurality of SIMs and a number of paging collisions in a unit of time is greater than a preset number of times.

In one example, the reason why one or more paging collisions occur between the plurality of SIMs may be one or more overlaps between the paging occasions, or may be some interference caused by factors such as the environment and results in a few accidental occurrences of the paging collision problem between the plurality of SIMs. In this case, the paging collision problem can be solved after eliminating the interference caused by the environmental factor, which requires no participation of the network-side device to solve the paging collision problem.

Therefore, in the case where there are the one or more paging collisions between the plurality of SIMs in this example, the number of paging collisions between the plurality of SIMs per unit time (which may be configured as required) is determined. If the number is relatively large, for example, greater than the preset number of times, it may be determined that the paging collisions between the plurality of SIMs is not accidental, but is caused by the overlaps between the paging occasions, and as a result, the information associated with the paging collision problem may be transmitted to the network-side device. If the number is less than the preset number of times, it may be determined that the paging collisions between the plurality of SIMs are accidental, and as a result, it is unnecessary to transmit the information associated with the paging collision problem to the network-side device, which avoids wasting communication resources.

Corresponding to the foregoing problem reporting method examples, the present disclosure also provides problem reporting apparatus examples.

Figure 16:
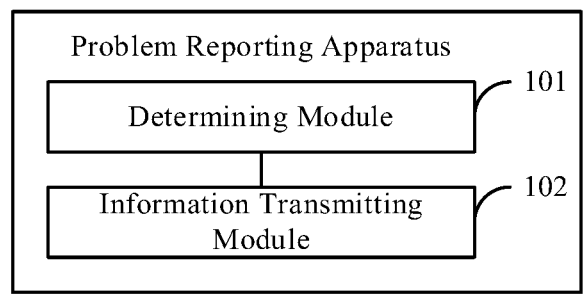
FIG. 16 illustrates a schematic block diagram of a problem reporting apparatus according to an example of the present disclosure.

FIG. 16 illustrates a schematic block diagram of a problem reporting apparatus according to an example of the present disclosure. The problem reporting apparatus illustrated in this example is applicable to a terminal. The terminal includes, but is not limited to, an electronic device such as a mobile phone, a tablet computer, a wearable device, a sensor, and an Internet of Things device. The terminal may act as user equipment to communicate with a base station. The base station includes, but is not limited to, a base station in a communication system, such as a 4G base station, a 5G base station, and a 6G base station.

A plurality of SIMs are inserted in the terminal. The plurality of SIMs may belong to the same operator network, or may belong to different operator networks. For example, the plurality of SIMs may belong to different operator networks. Alternatively, a part of the plurality of SIMs may belong to a first operator network, and the other part may belong to a second operator network.

As illustrated in FIG. 16, the problem reporting apparatus may include:
 a determining module 101 that is configured to determine a first SIM from the plurality of SIMs in response to determining that one or more paging collisions occur between the plurality of SIMs; and
 an information transmitting module 102 that is configured to transmit information associated with the one or more paging collisions to a network-side device via the first SIM.

Alternatively or additionally, the determining module is configured to determine that a first network-side device associated with the first SIM is capable of handling the one or more paging collisions; and determine, in response to determining that the first network-side device is capable of handling the one or more paging collisions, the first SIM for transmitting the information associated with the one or more paging collisions.

Alternatively or additionally, the determining module determines that the first network-side device associated with the first SIM is capable of handling the one or more paging collisions is in response to determining that the first network-side device associated with the first SIM is different from a second network-side device associated with a second SIM of the plurality of SIMs.

Alternatively or additionally, the determining module is configured to record, from network-side devices that have been accessed previously, one or more network-side devices capable of solving a paging collision problem to form a network-side device pool.

Figure 17:
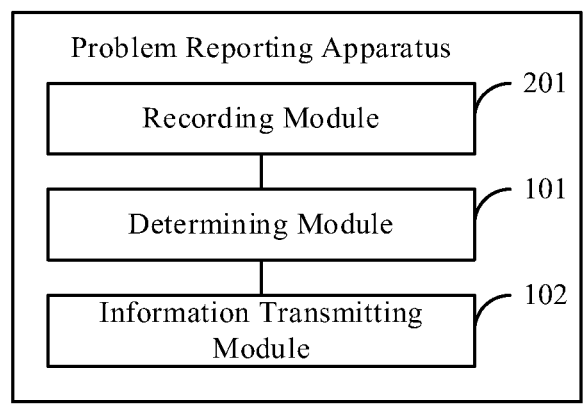
FIG. 17 illustrates a schematic block diagram of another problem reporting apparatus according to an example of the present disclosure.

FIG. 17 illustrates a schematic block diagram of another problem reporting apparatus according to an example of the present disclosure. As illustrated in FIG. 17, the apparatus further includes:
 a recording module 201 that is configured to record, from the network-side devices that have been accessed previously, the one or more network-side devices capable of solving the paging collision problem to form the network-side device pool.

Alternatively or additionally, the determining module is further configured to determine that the second network-side device is capable of handling the one or more paging collisions in response to determining that the first network-side device is different from the second network-side device.

Alternatively or additionally, the determining module is configured to determine the first SIM for transmitting the information associated with the one or more paging collisions in response to determining that a signal strength of the first network-side device is higher than a signal strength of the second network-side device.

Alternatively or additionally, the determining module is configured to determine the first SIM for transmitting the information associated with the one or more paging collisions in response to determining that a load of the first network-side device is lower than a load of the second network-side device.

Alternatively or additionally, the determining module is configured to randomly select one of the first SIM and the second SIM to transmit the information associated with one or more paging collisions.

Alternatively or additionally, the determining module is configured to select, based on first user configuration information, one of the first SIM and the second SIM for transmitting the information associated with the one or more paging collisions.

Alternatively or additionally, the determining module is configured to select randomly one of the plurality of SIMs as the first SIM in response to determining that network-side devices associated respectively with the plurality of SIMs are the same.

Alternatively or additionally, the determining module is configured to select, based on second user configuration information, one of the plurality of SIMs as the first SIM in response to determining that network-side devices associated respectively with the plurality of SIMs are the same.

Alternatively or additionally, the determining module is configured to select, based on network configuration information, one of the plurality of SIMs as the first SIM in response to determining that network-side devices associated respectively with the plurality of SIMs are the same.

Alternatively or additionally, the determining module is configured to perform respective accesses via the plurality of SIMs to their associated network-side devices, and after one of the plurality of SIMs has accessed its network-side device, prevent other SIMs from accessing their network-side devices, and take the SIM that has accessed its network-side device as the first SIM.

Alternatively or additionally, the information transmitting module is further configured to transmit assistance information and/or a recommended solution scheme about the information associated with the paging collision problem to the network-side device.

Figure 18:
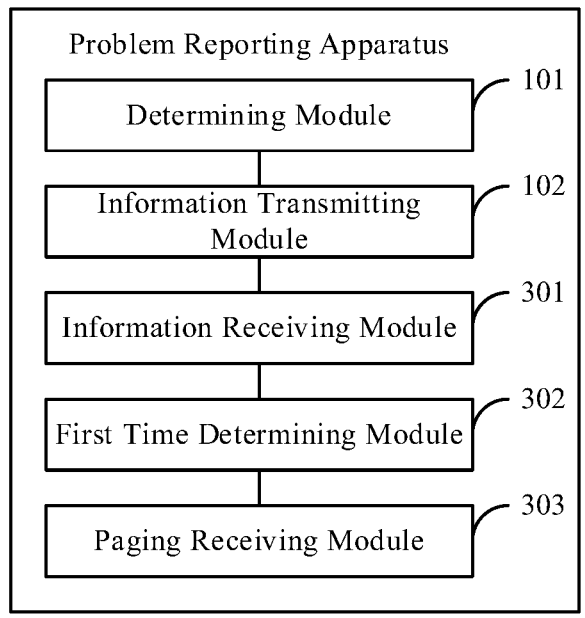
FIG. 18 illustrates a schematic block diagram of another problem reporting apparatus according to an example of the present disclosure.
Figure 19:
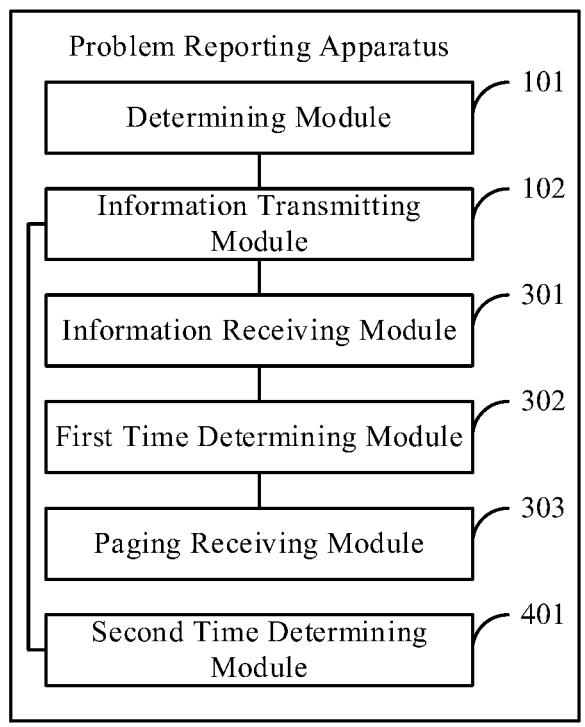
FIG. 19 illustrates a schematic block diagram of another problem reporting apparatus according to an example of the present disclosure.

FIG. 18 illustrates a schematic block diagram of another problem reporting apparatus according to an example of the present disclosure. As illustrated in FIG. 18, the apparatus further includes:
- an information receiving module 301 that is configured to receive a user device identification offset or a new user device identification transmitted by the network-side device;
- a first time determining module 302 that is configured to determine first time information based on the new user device identification or based on an original user device identification of the first SIM and the user device identification offset; and
- a paging receiving module 303 that is configured to control, according to the first time information, the first SIM to receive a paging message FIG. 19 illustrates a schematic block diagram of another problem reporting apparatus according to an example of the present disclosure. As illustrated in FIG. 19, the apparatus further includes:
- a second time determining module 401 that is configured to determine second time information for other SIMs of the plurality of SIMs than the first SIM to receive their paging messages.

Accordingly, the information transmitting module 102 is further configured to transmit the information associated with the paging collision problem to the network-side device via the first SIM in response to determining that one or more collisions occur between the first time information and the second time information.

Alternatively or additionally, the apparatus further includes:
- a third time determining module that is configured to determine the second time information for the other SIMs of the plurality of SIMs than the first SIM to receive the paging message.

Accordingly, the paging receiving module is configured to control, according to the first time information, the first SIM to receive the paging message in response to determining that no collision occurs between the first time information and the second time information.

Alternatively or additionally, the information transmitting module is configured to determine the first SIM from the plurality of SIMs in response to determining that the one or more paging collisions occur between the plurality of SIMs and a number of paging collisions in a unit of time is greater than a preset number of times.

Regarding the apparatus in the foregoing examples, the specific manner in which each module performs its operation has been described in detail in the examples of the related methods, and will not be repeated here.

Since the apparatus examples essentially correspond to the method examples, reference may be made to the description of related parts of the method examples. The apparatus examples described above are merely illustrative, in which the modules described as separate components may or may not be physically separated, and the components displayed as modules may or may not be physical modules, that is, may be located in one place or distributed to multiple modules in a network. Some or all of the modules may be selected according to actual needs to achieve the objectives of the implementations of the examples. It can be understood and implemented by those of ordinary skill in the art without any creative effort.

The examples of the present disclosure also provide an electronic device, including:
- one or more processors; and
- one or more memories for storing instructions executable by the one or more processors.

The one or more processors are configured to implement the method described in any of the above examples.

The examples of the present disclosure also provide a computer-readable storage medium having a computer program stored thereon. The program, when executed by one or more processors, implements the steps of the method described in any of the above examples.

Figure 20:
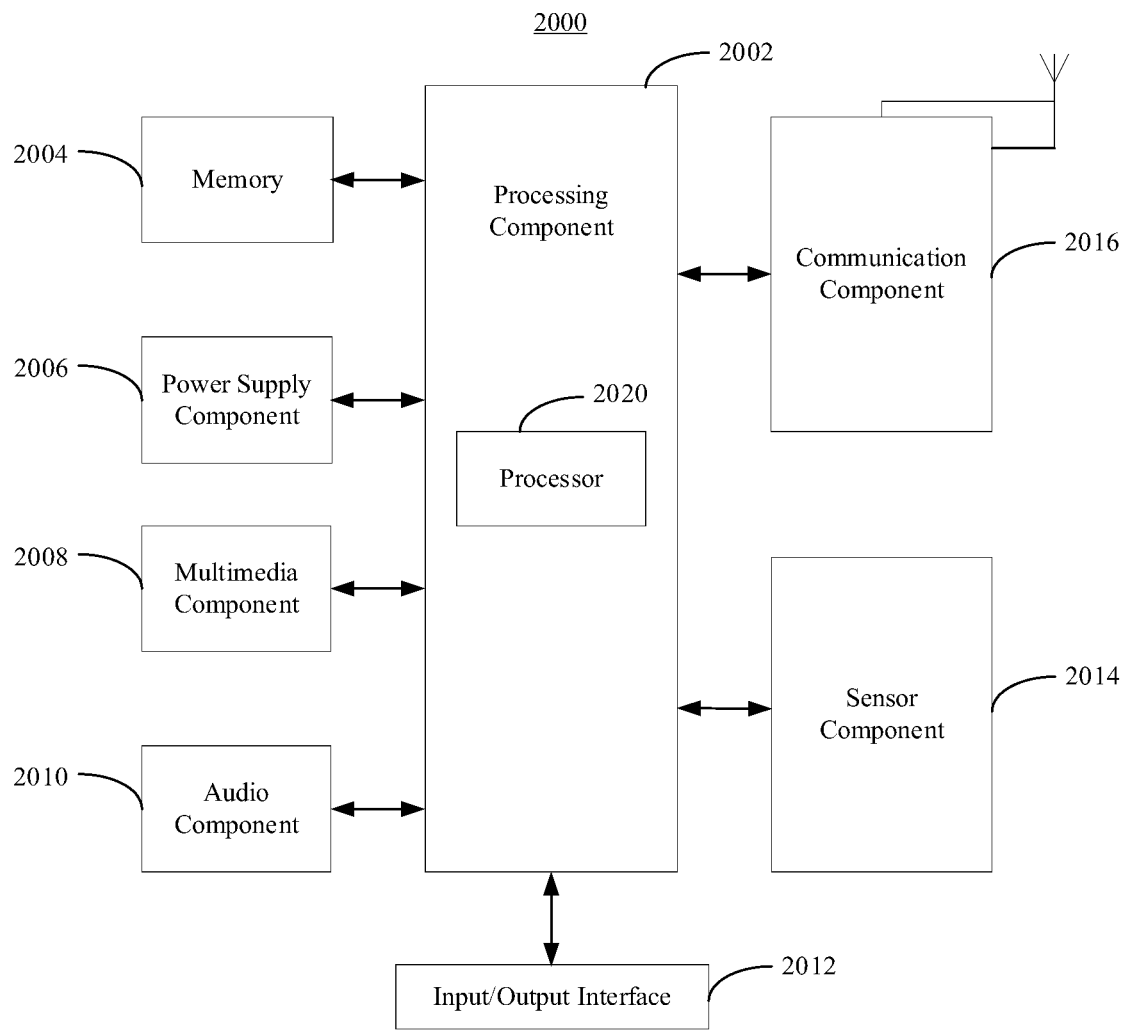
FIG. 20 illustrates a schematic block diagram of an apparatus for problem reporting according to an example of the present disclosure.

FIG. 20 illustrates a schematic block diagram of an apparatus 2000 for problem reporting according to an example of the present disclosure. For example, the apparatus 2000 may be a mobile phone, a computer, a digital broadcasting terminal, a messaging device, a game console, a tablet device, a medical device, a fitness device, a personal digital assistant, and the like.

As illustrated in FIG. 20, the apparatus 2000 may include one or more of the following components: a processing component 2002, a memory 2004, a power supply component 2006, a multimedia component 2008, an audio component 2010, an input/output (I/O) interface 2012, a sensor component 2014, and a communication component 2016.

The processing component 2002 generally controls the overall operations of the apparatus 2000, such as operations associated with display, phone calls, data communications, camera operations, and recording operations. The processing component 2002 may include one or more processors 2020 to execute instructions to complete all or a part of the steps of the above methods. In addition, the processing component 2002 may include one or more modules, which facilitate the interaction between the processing component 2002 and other components. For example, the processing component 2002 may include a multimedia module to facilitate the interaction between the multimedia component 2008 and the processing component 2002.

The memory 2004 is configured to store various types of data to support the operations of the apparatus 2000. Examples of such data include instructions for any application or method operated on the apparatus 2000, contact data, phonebook data, messages, pictures, videos, and the like. The memory 2004 may be implemented by any type of volatile or non-volatile storage device or a combination thereof, such as a static random access memory (SRAM), an electrically erasable programmable read-only memory (EE-PROM), an erasable and programmable read-only memory (EPROM), a programmable read-only memory (PROM), a read-only memory (ROM), a magnetic memory, a flash memory, a magnetic disk or an optical disk.

The power supply component 2006 provides power for various components of the apparatus 2000. The power supply component 2006 may include a power management system, one or more power supplies, and other components associated with generating, managing, and distributing power for the apparatus 2000.

The multimedia component 2008 includes a screen providing an output interface between the apparatus 2000 and a user. In some examples, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some examples, the multimedia component 2008 includes a front camera and/or a rear camera. The front camera and/or rear camera may receive external multimedia data when the apparatus 2000 is in an operating mode, such as a photographing mode or a video mode. Each front camera and rear camera may be a fixed optical lens system or have focal length and optical zooming capability.

The audio component 2010 is configured to output and/or input an audio signal. For example, the audio component 2010 includes a microphone (MIC) that is configured to receive an external audio signal when the apparatus 2000 is in an operating mode, such as a call mode, a recording mode, and a voice recognition mode. The received audio signal may be further stored in memory 2004 or transmitted via communication component 2016. In some examples, the audio component 2010 also includes a speaker for outputting an audio signal.

The I/O interface 2012 provides an interface between the processing component 2002 and a peripheral interface module. The above peripheral interface module may be a keyboard, a click wheel, buttons, or the like. These buttons may include, but not be limited to, a home button, a volume button, a start button, and a lock button.

The sensor component 2014 includes one or more sensors to provide the apparatus 2000 with status assessments in various aspects. For example, the sensor component 2014 may detect an open/closed state of the apparatus 2000 and a relative positioning of components such as the display and keypad of the apparatus 2000, and the sensor component 2014 may also detect a change in position of the apparatus 2000 or a component of the apparatus 2000, the presence or absence of user contact with the apparatus 2000, orientation or acceleration/deceleration of the apparatus 2000, and temperature change of the apparatus 2000. The sensor component 2014 may include a proximity sensor configured to detect the presence of a nearby object without any physical contact. The sensor component 2014 may further include an optical sensor, such as a complementary metal-oxide-semiconductor (CMOS) or charged coupled device (CCD) image sensor, which is used in imaging applications. In some examples, the sensor component 2014 may also include an acceleration sensor, a gyro sensor, a magnetic sensor, a pressure sensor, or a temperature sensor.

The communication component 2016 is configured to facilitate wired or wireless communication between the apparatus 2000 and other devices. The apparatus 2000 may access a wireless network based on a communication standard, such as WiFi, 2G or 3G, 4G LTE, 5G NR, or a combination thereof. In one example, the communication component 2016 receives broadcast signals or broadcast related information from an external broadcast management system via a broadcast channel. In an example, the communication component 2016 also includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth® (BT) technology, and other technologies.

In one or more examples, the apparatus 2000 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components for performing the above methods.

In one or more examples, a non-transitory computer-readable storage medium is also provided, including instructions, such as the memory 2004, including instructions. These instructions may be executed by the processor 2020 of the apparatus 2000 to complete the above methods. For example, the non-transitory computer-readable storage medium may be a read-only memory (ROM), a random access memory (RAM), a CD-ROM, a magnetic tape, a floppy disk, an optical data storage device, and the like.

According to the examples of the present disclosure, when there are one or more paging collisions between a plurality of SIMs, information associated with a paging collision problem is transmitted to a network-side device via only one of the plurality of SIMs, rather than via each of the plurality of SIMs separately. Thus, it can be ensured that only one network-side device receives the paging collision problem, and then provides feedback information to one SIM, so that the SIM receiving the feedback information changes its paging occasion for a paging message reception while the other SIMs do not change their paging occasions for the paging message reception, thereby avoiding a situation where the paging collision problem continues to occur due to the change of the paging occasion of each SIM.

Other implementations of the present disclosure will be readily apparent to those skilled in the art after implementing the disclosure by referring to the specification. The present disclosure is intended to cover any variations, uses, or adaptations of the present disclosure that are in accordance with the general principles thereof and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above-described accurate structures illustrated in the drawings, and various modifications and changes can be made to the present disclosure without departing from the scope thereof. The scope of the present disclosure is to be limited only by the appended claims.

It should be noted that the relational terms such as "first" and "second" used herein are merely intended to distinguish one entity or operation from another entity or operation rather than to require or imply any such actual relationship or order existing between these entities or operations. Also, the term "including", "containing", or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in a process, method, article or device including the element.

The methods and apparatuses provided by the examples of the present disclosure are described in detail above. Specific examples are used in this disclosure to illustrate the principle and the implementations of the present disclosure. The description of the above examples is only used to help understand the methods and its core idea of the present disclosure. Moreover, those skilled in the art can change both the specific implementations and the application scope according to the idea of the present disclosure. In summary, the content of this specification should not be construed as a limitation to the present disclosure.

The invention claimed is:

1. A paging collisions problem reporting method, being applicable to a terminal in which a plurality of subscriber identity modules (SIMs) are inserted, comprising:
   determining that a first network-side device associated with a first SIM of the plurality of SIMs is different from a second network-side device associated with a second SIM of the plurality of SIMs in response to determining that one or more paging collisions occur between the plurality of SIMs,
   determining that the first network-side device is capable of handling the one or more paging collisions in response to determining that the first network-side device is different from the second network-side device;
   determining, in response to determining that the first network-side device is capable of handling the one or more paging collisions, the first SIM as a target SIM for transmitting information associated with the one or more paging collisions; and
   transmitting the information associated with the one or more paging collisions to a network-side device via the target SIM.

2. The method of claim 1, further comprising:
   determining the target SIM from the plurality of SIMs in response to determining that the one or more paging collisions occur between the plurality of SIMs and a number of paging collisions in a unit of time is greater than a preset number of times.

3. An electronic device, comprising:
   one or more processors; and
   one or more memories for storing instructions executable by the one or more processors;
   wherein the one or more processors are configured to implement the method according to claim 1.

4. The method according to claim 1, wherein determining that the first network-side device is capable of handling the one or more paging collisions comprises:
   determining that the first network-side device belongs to a network-side device pool which comprises one or more network-side devices having a paging collision handle capability.

5. The method according to claim 4, further comprising:
   recording, from network-side devices that have been accessed previously, the one or more network-side devices having the paging collision handle capability to form the network-side device pool.

6. The method according to claim 1, further comprising:
   determining that the second network-side device is capable of handling the one or more paging collisions in response to determining that the first network-side device is different from the second network-side device.

7. The method according to claim 6, wherein determining the first SIM as the target SIM for transmitting the information associated with the one or more paging collisions comprises:
   determining the first SIM as the target SIM for transmitting the information associated with the one or more paging collisions in response to determining that a signal strength of the first network-side device is higher than a signal strength of the second network-side device; or
   determining the first SIM as the target SIM for transmitting the information associated with the one or more paging collisions in response to determining that a load of the first network-side device is lower than a load of the second network-side device.

8. The method according to claim 6, wherein
   the first SIM as the target SIM for transmitting the information associated with the one or more paging collisions is selected based on first user configuration.

9. The method according to claim 6, wherein
   the first SIM as the target SIM for transmitting the information associated with the one or more paging collisions is selected randomly.

10. A non-transitory computer-readable storage medium having a computer program stored thereon, wherein the computer program, when executed by one or more processors, implements the steps of the method according to claim 1.

11. The method according to claim 1, further comprising:
    selecting randomly one of the plurality of SIMs as the target SIM in response to determining that network-side devices associated respectively with the plurality of SIMs are the same.

12. The method according to claim 1, further comprising:
    selecting, based on second user configuration information, one of the plurality of SIMs as the target SIM in response to determining that network-side devices associated respectively with the plurality of SIMs are the same.

13. The method according to claim 1, further comprising:
    selecting, based on network configuration information, one of the plurality of SIMs as the target SIM in response to determining that network-side devices associated respectively with the plurality of SIMs are the same.

14. The method according to claim 1, further comprising:
performing respective accesses via the plurality of SIMs to their associated network-side devices, and
after one of the plurality of SIMs has accessed its network-side device,
  preventing other SIMs from accessing their network-side devices, and
  taking the SIM that has accessed its network-side device as the target SIM.

15. The method according to claim 1, further comprising:
transmitting at least one of assistance information or a recommended solution scheme about the information associated with the one or more paging collisions to the network-side device.

16. The method according to claim 1, further comprising:
receiving a user device identification offset or a new user device identification transmitted by the network-side device;
determining first time information based on the new user device identification or based on an original user device identification of the target SIM and the user device identification offset; and
controlling the target SIM to receive a paging message according to the first time information.

17. The method according to claim 16, further comprising:
determining second time information for other SIMs of the plurality of SIMs than the target SIM to receive their paging messages; and
transmitting information associated with a paging collision problem to the network-side device via the target SIM in response to determining that one or more collisions occur between the first time information and the second time information.

18. The method according to claim 16, wherein controlling the target SIM to receive the paging message according to the first time information comprises:
controlling the target SIM to receive the paging message according to the first time information in response to determining that no collision occurs between the first time information and second time information.

* * * * *